United States Patent
Chae et al.

(10) Patent No.: US 11,820,234 B2
(45) Date of Patent: Nov. 21, 2023

(54) POWERTRAIN FOR VEHICLE AND BRAKING CONTROL METHOD THEREOF

(71) Applicants: Hyundai Motor Company, Seoul (KR); Kia Motors Corporation, Seoul (KR)

(72) Inventors: Min Ho Chae, Incheon (KR); Soon Ki Eo, Ansan-si (KR); Chon Ok Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 451 days.

(21) Appl. No.: 17/035,315

(22) Filed: Sep. 28, 2020

(65) Prior Publication Data
US 2022/0009337 A1   Jan. 13, 2022

(30) Foreign Application Priority Data
Jul. 10, 2020  (KR) .......................... 10-2020-0085396

(51) Int. Cl.
*B60W 10/08*   (2006.01)
*B60K 6/445*   (2007.10)
*B60K 6/365*   (2007.10)
*B60W 10/184*  (2012.01)
(Continued)

(52) U.S. Cl.
CPC ............. *B60K 6/445* (2013.01); *B60K 6/365* (2013.01); *B60K 17/346* (2013.01); *B60W 10/08* (2013.01); *B60W 10/184* (2013.01); *B60W 30/18127* (2013.01); *B60W 2510/083* (2013.01); *B60W 2520/10* (2013.01); *B60W 2552/40* (2020.02);
(Continued)

(58) Field of Classification Search
CPC ...... B60K 6/445; B60K 6/365; B60K 17/346; B60K 6/52; B60K 17/3462; B60K 17/348; B60K 17/356; B60K 17/34; B60K 1/00; F16H 3/72; B60W 10/08; B60W 10/184; B60W 30/18127; B60W 2510/083; B60W 2520/10; B60W 2552/40; B60W 2710/08; B60W 2710/18; B60L 15/2009
USPC ........................ 475/5, 150, 207, 218; 701/22
See application file for complete search history.

(56) References Cited

U.S. PATENT DOCUMENTS 10,940,750 B2 *   3/2021   Pan ..................... B60K 6/365
11,448,299 B2 *   9/2022   Murakami ........ B60K 23/0808
(Continued)

FOREIGN PATENT DOCUMENTS

KR   10-2006-0091488   8/2006

*Primary Examiner* — Roger L Pang
*Assistant Examiner* — Aimee Tran Nguyen
(74) *Attorney, Agent, or Firm* — MORGAN, LEWIS & BOCKIUS LLP

(57) ABSTRACT

A powertrain for a vehicle may include a motor; a planetary gear set mounted to rotate parallel to a rotation shaft of the motor so that one rotation element may exchange power with the motor; a front wheel driveshaft engaged to the planetary gear set to receive power from another rotation element of the planetary gear set and to transfer a rotating force to a front wheel coupled to the front wheel driveshaft; and a rear wheel driveshaft engaged to the planetary gear set and mounted to receive power from the other rotation element of the planetary gear set to rotate parallel to the rotation shaft of the motor, and to transfer a rotating force to a rear wheel coupled to the rear wheel driveshaft.

14 Claims, 5 Drawing Sheets

(51) Int. Cl.
*B60W 30/18* (2012.01)
*B60K 17/346* (2006.01)
(52) U.S. Cl.
CPC ..... *B60W 2710/08* (2013.01); *B60W 2710/18* (2013.01)

(56) References Cited

U.S. PATENT DOCUMENTS

| | | | | |
|---|---|---|---|---|
| 2006/0220453 | A1* | 10/2006 | Saito | B60W 10/184 303/152 |
| 2009/0111640 | A1* | 4/2009 | Buur | B60W 20/13 477/3 |
| 2010/0114424 | A1* | 5/2010 | Morris | F16H 59/68 701/51 |
| 2011/0276241 | A1* | 11/2011 | Nakao | B60W 10/06 477/3 |
| 2011/0314960 | A1* | 12/2011 | Yoshimura | B60W 10/14 74/650 |
| 2012/0077633 | A1* | 3/2012 | Mueller | B60K 23/0808 475/5 |

\* cited by examiner

POWERTRAIN FOR VEHICLE AND BRAKING CONTROL METHOD THEREOF

CROSS REFERENCE TO RELATED APPLICATION

The present application claims priority to Korean Patent Application No. 10-2020-0085396 filed on Jul. 10, 2020, the entire contents of which is incorporated herein for all purposes by this reference.

BACKGROUND OF THE DISCLOSURE

Field of the Disclosure

The present invention relates to a powertrain which may be used in an electric vehicle and the like, and a braking control thereof.

Description of Related Art

Since a motor is mounted in a hybrid vehicle or an electric vehicle, regenerative braking may be performed using a mounted motor when the vehicle is braked.

The regenerative braking is a major means which may recover and reuse the energy of the vehicle, improving fuel efficiency of the vehicle. Accordingly, it is necessary for the hybrid vehicle or the electric vehicle to secure stable braking performance even while maximizing regenerative braking performance.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a powertrain for a vehicle and a braking control method, which may improve regenerative braking performance to increase an energy recovery rate of the vehicle, improving fuel efficiency of the vehicle, and may not be mounted with expensive complicated devices, securing stable braking performance while reducing the cost of the vehicle.

A powertrain for a vehicle according to various exemplary embodiments of the present invention for achieving the object is configured to include: a motor; a planetary gear set mounted to rotate parallel to a rotation shaft of the motor so that one rotation element may exchange power with the motor; a front wheel driveshaft engaged to the planetary gear set to receive power from another rotation element of the planetary gear set and to transfer a rotating force to a front wheel coupled to the front wheel driveshaft; and a rear wheel driveshaft engaged to the planetary gear set and mounted to receive power from the other rotation element of the planetary gear set to rotate parallel to the rotation shaft of the motor, and to transfer a rotating force to a rear wheel coupled to the rear wheel driveshaft.

The planetary gear set may include a single pinion planetary gear set, and the rotation shaft of the motor may be connected to a planet carrier of the planetary gear set to exchange power therebetween.

The rotation shaft of the motor may be formed of a hollow shaft, and any one of the front wheel driveshaft and the rear wheel driveshaft may be mounted to penetrate an interior of the rotation shaft of the motor.

A first gear may be provided on the rotation shaft of the motor, a second gear gear-engaged to the first gear may be provided on a planet carrier of the planetary gear set, a third gear may be provided on a ring gear of the planetary gear set, and a fourth gear gear-engaged to the third gear may be provided on one of the front wheel driveshaft and the rear wheel driveshaft, which is mounted to penetrate the rotation shaft of the motor.

A fifth gear may be provided on a sun gear of the planetary gear set, and a sixth gear gear-engaged to the fifth gear may be provided on the other one other than one of the front wheel driveshaft and the rear wheel driveshaft, which is mounted to penetrate the rotation shaft of the motor.

The planetary gear set may include a double pinion planetary gear set, and the rotation shaft of the motor may be connected to the ring gear of the planetary gear set to exchange power therebetween.

The rotation shaft of the motor may be formed of a hollow shaft, and any one of the front wheel driveshaft and the rear wheel driveshaft may be mounted to penetrate an interior of the rotation shaft of the motor.

A first gear may be provided on the rotation shaft of the motor, a second gear gear-engaged to the first gear may be provided on a ring gear of the planetary gear set, a third gear may be provided on a planet carrier gear of the planetary gear set, and a fourth gear gear-engaged to the third gear may be provided on one of the front wheel driveshaft and the rear wheel driveshaft, which is mounted to penetrate the rotation shaft of the motor.

A fifth gear may be provided on a sun gear of the planetary gear set, and a sixth gear gear-engaged to the fifth gear may be provided on the other one other than one of the front wheel driveshaft and the rear wheel driveshaft, which is mounted to penetrate the rotation shaft of the motor.

Furthermore, a braking control method for a vehicle according to various exemplary embodiments of the present invention for achieving the object is configured to include: as the braking control method for a vehicle mounted with the aforementioned powertrain, generating, by a controller, a braking torque distribution map according to a vehicle speed and friction characteristics of a road and a maximum possible regenerative braking torque using an ideal braking force line diagram; distributing, by the controller, braking torques of the front wheel and the rear wheel according to the braking torque distribution map and a required braking torque; distributing, by the controller, the distributed braking torques of the front wheel and the rear wheel into a regenerative braking torque and a friction braking torque; and controlling, by the controller, the motor according to the regenerative braking torque, and performing friction braking with a friction braking mechanism according to the friction braking torque.

Assuming that on the ideal braking force line diagram, an intersection point between an ideal braking force distribution line and a maximum deceleration line at which a vehicle may be braked by the motor is set as a control point A, an intersection point between a straight line connecting the control point A and the maximum deceleration line at which a vehicle may be braked by the motor based on a current vehicle speed from an origin at which braking forces of the front wheel and the rear wheel are 0 is set as a control point B, an intersection point at which a straight line extending from the control point B at the same slope as a simple braking force distribution line of a braking device having a constant front and rear wheel braking force distribution ratio meets the ideal braking force distribution line is set as a control point C, an intersection point at which the simple braking force distribution line meets the ideal braking force distribution line is set as a control point D, the braking torque distribution map may be configured to partition a deceleration region so that a deceleration region which is the control point B or less is set as a section 1, a deceleration region which exceeds the control point B and is the control point C or less is set as a section 2, a deceleration region which exceeds the control point C and is the control point D or less is set as a section 3, and a deceleration region which exceeds the control point D is set as a section 4, and to distribute a braking force according to different braking force distribution lines per each section of the section 1, the section 2, the section 3 and the section 4.

In the section 1, the braking force distribution line may be formed of a straight line connecting the control point B from an origin at which all the braking forces of the front wheel and the rear wheel are 0, in the section 2, the braking force distribution line may be formed of a straight line connecting the control point C from the control point B, in the section 3, the braking force distribution line may be formed of a straight line connecting the control point D from the control point C, and in the section 4, the braking force distribution line may be formed of a straight line extending from the control point D along the simple braking force distribution line.

In the section 1, the braking force distribution line may be formed of a straight line connecting the control point B from an origin at which all the braking forces of the front wheel and the rear wheel are 0, and if a required deceleration of a driver is changed in the section 1, the controller may satisfy the required deceleration only with regenerative braking by the motor.

In the section 2, the braking force distribution line may be formed of a straight line connecting the control point C from the control point B, and if the required deceleration of the driver is changed in the section 2, the controller may be configured to control the motor to allow the regenerative braking to maintain the level of the control point B, and to add only the friction braking by the friction braking mechanism thereto, satisfying the required deceleration.

In the section 3, the braking force distribution line may be formed of a straight line connecting the control point D from the control point C, and if the required deceleration of the driver is increased in the section 3, the controller may increase the friction braking by the friction braking mechanism while gradually reducing the regenerative braking by the motor, satisfying the required deceleration.

The controller may linearly reduce the regenerative braking by the motor from the level of the control point B to 0, as the required deceleration of the driver increase over the entire section of the section 3.

In the section 4, the braking force distribution line may be formed of a straight line extending from the control point D along the simple braking force distribution line, and if the required deceleration of the driver increases in the section 4, as a result, the controller may linearly increase a friction braking force by the friction braking mechanism.

The present invention may improve the regenerative braking performance to increase the energy recovery rate of the vehicle, improving fuel efficiency of the vehicle, and may not be mounted with the expensive complicated devices, the stable braking performance even while reducing the cost of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
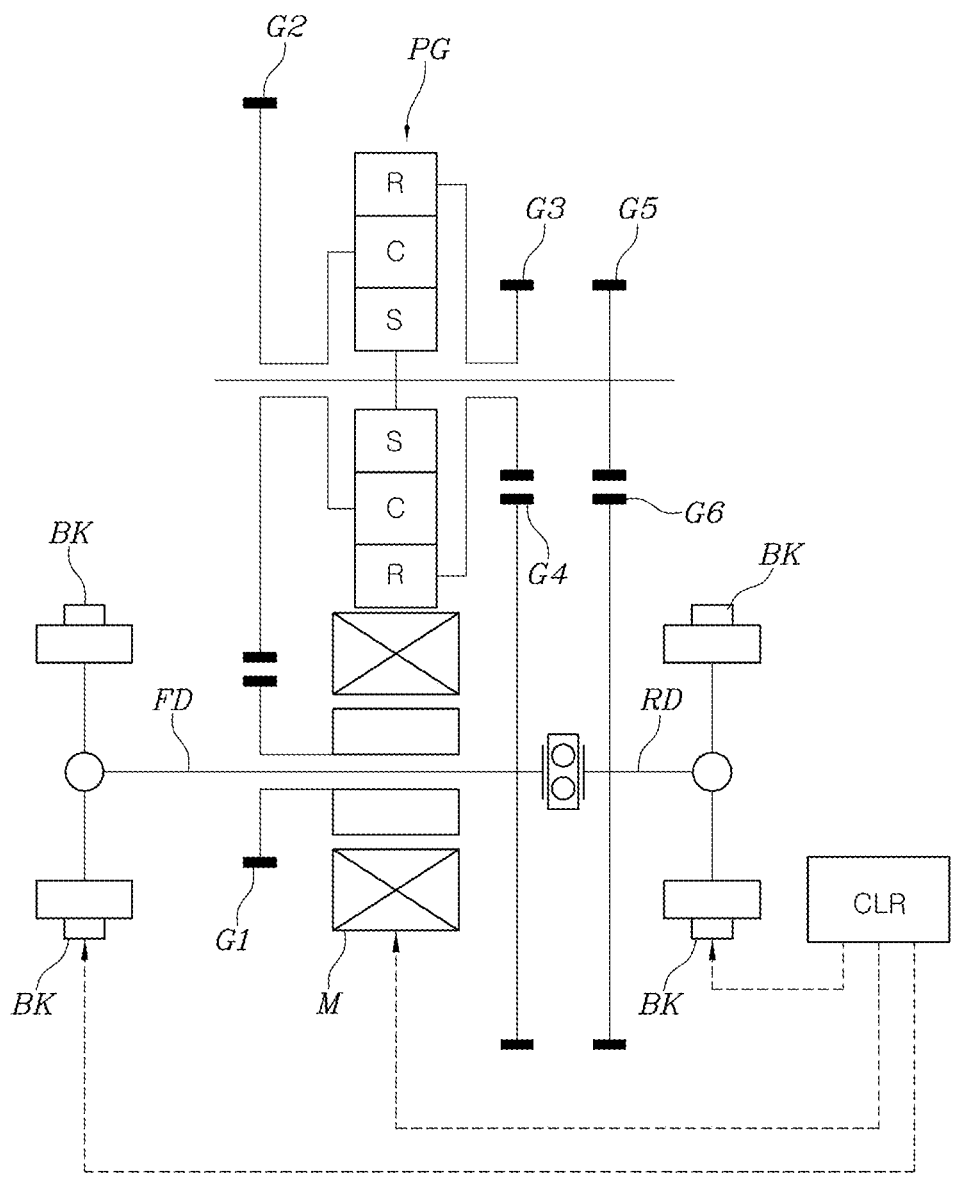
FIG. 1 is a diagram illustrating various exemplary embodiments of a powertrain for a vehicle according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Figure 2:
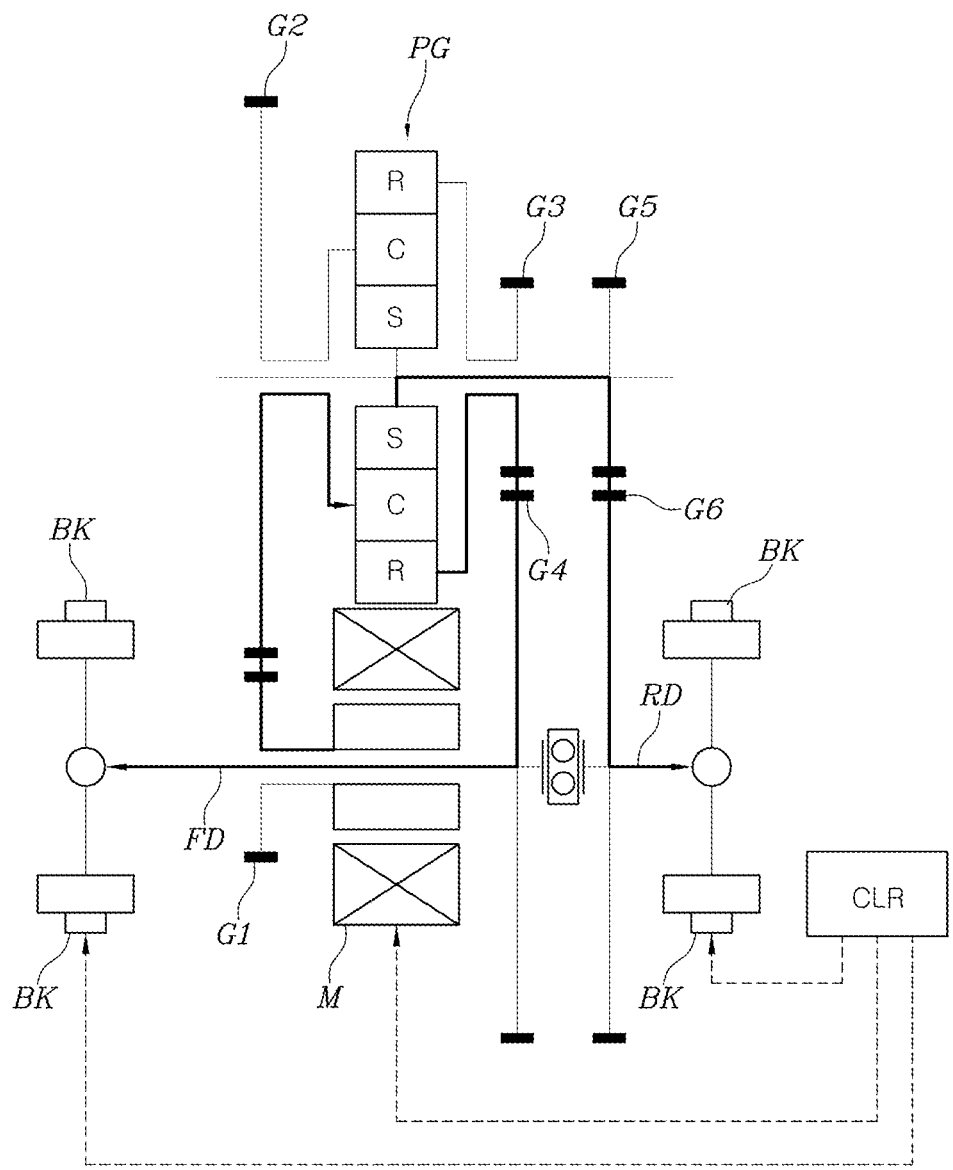
FIG. 2 is a diagram illustrating a power flow of the powertrain illustrated in FIG. 1.
Figure 3:
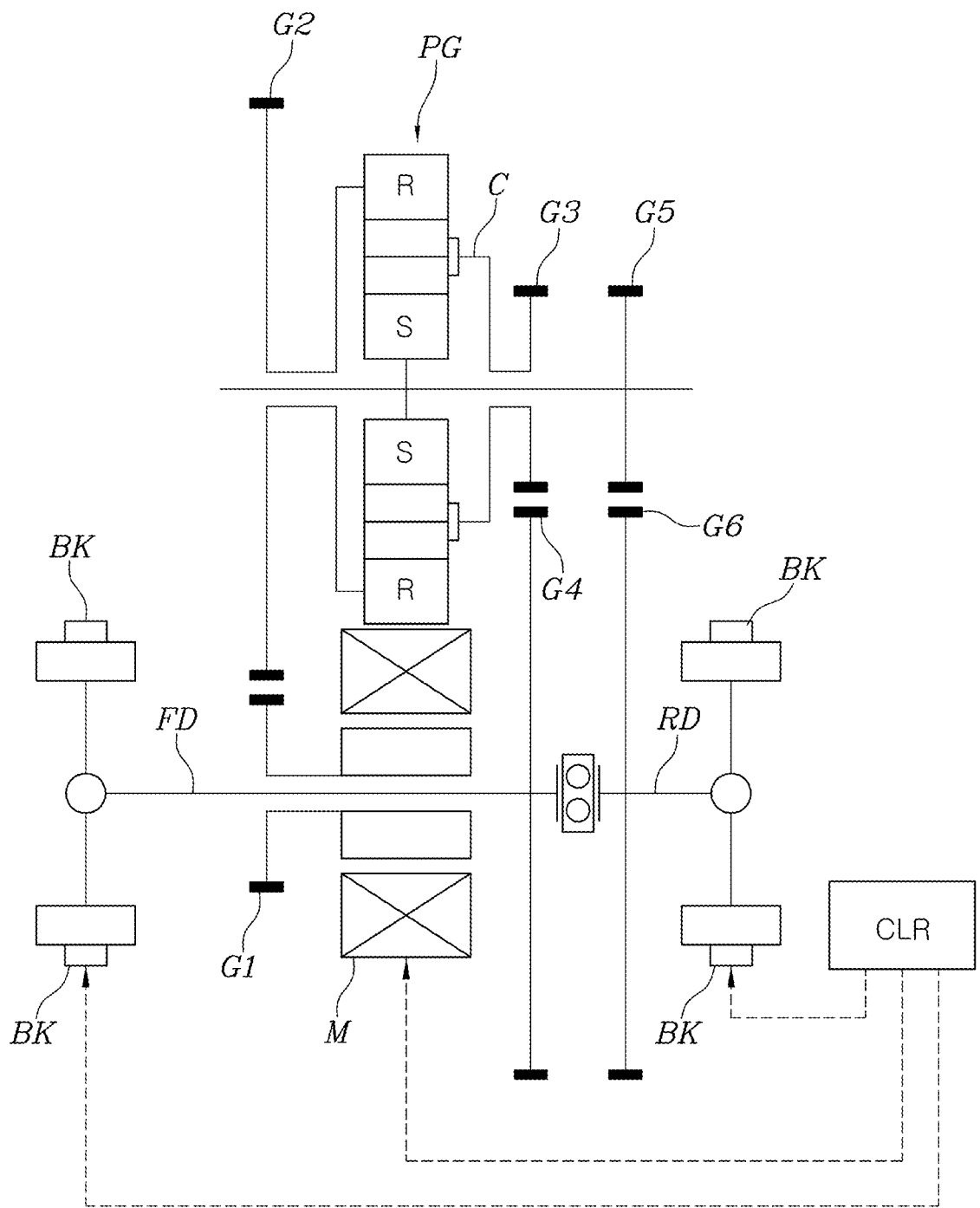
FIG. 3 is a diagram illustrating various exemplary embodiments of the powertrain of a vehicle according to various exemplary embodiments of the present invention.

Referring to FIG. 1, FIG. 2, and FIG. 3, various exemplary embodiments of a powertrain for a vehicle according to various exemplary embodiments of the present invention are commonly configured to include a motor M; a planetary gear set PG mounted to rotate parallel to a rotation shaft of the motor M so that one rotation element may exchange power with the motor M; a front wheel driveshaft FD mounted to receive power from another rotation element of the planetary gear set PG to rotate parallel to the rotation shaft of the motor M, and to transfer a rotating force to a front wheel coupled to the front wheel driveshaft; and a rear wheel driveshaft RD mounted to receive power from the other one rotation element of the planetary gear set PG to rotate parallel to the rotation shaft of the motor M, and to transfer a rotating force to a rear wheel coupled to the rear wheel driveshaft.

That is, the powertrain is configured to connect the motor M to one rotation element of the planetary gear set PG having three rotation elements to supply power, and to allow the other two rotation elements to supply power to the front wheel and the rear wheel, respectively.

In the various exemplary embodiments illustrated in FIG. 1 and FIG. 2, the planetary gear set PG includes a single pinion planetary gear set; and the rotation shaft of the motor M is connected to exchange power with a planet carrier C of the planetary gear set PG.

The rotation shaft of the motor M is formed of a hollow shaft, and any one of the front wheel driveshaft FD and the rear wheel driveshaft RD is mounted to penetrate an interior of the rotation shaft of the motor M.

For reference, FIG. 1 illustrates a configuration in which the front wheel driveshaft FD is mounted to penetrate an interior of the rotation shaft of the motor M, in which of course, the rear wheel driveshaft RD may also be configured to be mounted to penetrate an interior of the rotation shaft of the motor M.

A first gear G1 is provided on the rotation shaft RS of the motor M, a second gear G2 engaged to the first gear G1 is provided on the planet carrier C of the planetary gear set PG, a third gear G3 is provided on a ring gear R of the planetary gear set PG, and a fourth gear G4 engaged to the third gear G3 is provided on one of the front wheel driveshaft FD and the rear wheel driveshaft RD, which is mounted to penetrate the rotation shaft of the motor M.

Furthermore, a fifth gear G5 is provided on a sun gear S of the planetary gear set PG in which the sub gear S is mounted on an intermediate shaft IS, and a sixth gear G6 engaged to the fifth gear G5 is provided on the other one other than one of the front wheel driveshaft FD and the rear wheel driveshaft RD, which is mounted to penetrate the rotation shaft of the motor M.

Accordingly, as illustrated in FIG. 2, the power input from the motor M to the planet carrier C of the planetary gear set PG through the second gear G2 engaged to the first gear G1 is transferred to the front wheel side through the ring gear R, the third gear G3, and the fourth gear G4, and simultaneously transferred to the rear wheel side through the sun gear S, the fifth gear G5, and the sixth gear G6.

For reference, an unmentioned label BR in FIG. 1 means a bearing positioned between the front wheel driveshaft FD and the rear wheel driveshaft RD.

Furthermore, a controller CLR is configured to control the motor M, and the controller CLR is configured to control a friction braking mechanism BK mounted on each vehicle wheel to perform friction braking.

Meanwhile, in various exemplary embodiments illustrated in FIG. 3, the planetary gear set PG includes a double pinion planetary gear set, and in the instant case, the rotation shaft of the motor M is connected to a ring gear R of the planetary gear set PG to exchange power therebetween.

The rotation shaft of the motor M is formed of a hollow shaft, and any one of the front wheel driveshaft FD and the rear wheel driveshaft RD is mounted to penetrate an interior of the rotation shaft of the motor M.

The first gear G1 is provided on the rotation shaft of the motor M, the second gear G2 engaged to the first gear G1 is provided on the ring gear R of the planetary gear set PG, the third gear G3 is provided on the planet carrier C of the planetary gear set PG, and the fourth gear G4 engaged to the third gear G3 is provided on one of the front wheel driveshaft FD and the rear wheel driveshaft RD, which is mounted to penetrate the rotation shaft of the motor M.

Furthermore, the fifth gear G5 is provided on the sun gear S of the planetary gear set PG, and the sixth gear G6 engaged to the fifth gear G5 is provided on the other one other than one of the front wheel driveshaft FD and the rear wheel driveshaft RD, which is mounted to penetrate the rotation shaft of the motor M.

That is, in the various exemplary embodiments illustrated in FIG. 3, the planetary gear set PG is a double pinion planetary gear set, and the second gear G2 engaged to the first gear G1 connected to the motor M is connected to the ring gear R, and instead, only the configuration in which the third gear G3 is connected to the planet carrier C is different from that of the various exemplary embodiments of FIG. 1.

The aforementioned powertrain of the vehicle according to various exemplary embodiments of the present invention may constantly determine a speed ratio between the front wheel driveshaft FD and the rear wheel driveshaft RD by a gear ratio of the planetary gear set PG, implement four-wheel drive with a simple configuration, and perform the braking control according to a braking control method to be described later, increasing the energy recovery rate by the regenerative braking even without employing an expensive braking system, and thus improving fuel efficiency of a vehicle.

For reference, the friction braking mechanism BK is a braking device configured for forming a simple front and rear wheel braking force distribution ratio which increases at a constant slope, and for example, means a conventional electronic stability control (ESC) device or the like mounted on a general vehicle rather than a hybrid vehicle or an electric vehicle.

The conventional hybrid vehicle or electric vehicle is mounted with a cooperative control braking system which implements required braking torque by properly combining regenerative braking torque by the motor M and friction braking torque by a braking device, and a conventional active hydraulic boost (AHB), an integrated electric brake (IEB), or the like correspond to such a cooperative control braking system, but these are more expensive than the conventional ESC device having no cooperative control function.

Accordingly, even if the vehicle is not mounted with the AHB or the IEB described above and mounted with only the braking device in which the braking control is performed according to the simple braking force distribution line in which the braking force distribution ratio of the front and rear wheels has a constant slope, such as the conventional ESC device, the present invention may increase the regenerative braking amount, improving fuel efficiency, and distribute the front braking torque and the rear braking torque similarly to an ideal braking force distribution line as possible, also securing excellent braking stability of a vehicle.

Figure 4:
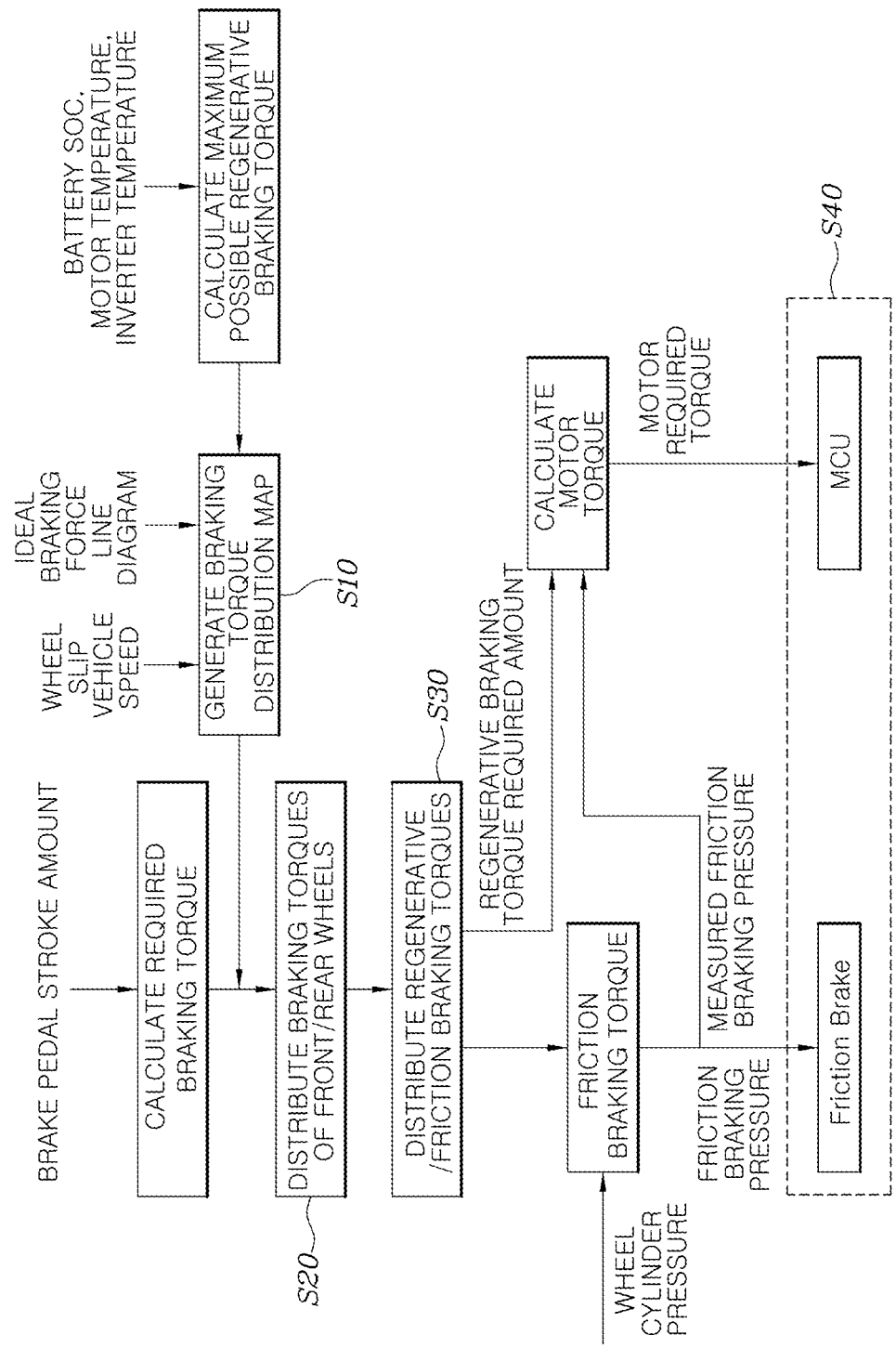
FIG. 4 is a flowchart illustrating an exemplary embodiment of a braking control method of a vehicle according to various exemplary embodiments of the present invention.

Referring to FIG. 4, as a braking control method of a vehicle provided with the powertrain described above, the braking control method of a vehicle according to various exemplary embodiments of the present invention is configured to include generating, by the controller CLR, the braking torque distribution map considering of a vehicle speed and friction characteristics of a road and the maximum possible regenerative braking torque using an ideal braking force line diagram (S10); distributing, by the controller CLR, braking torques of the front and rear wheels in consideration of the braking torque distribution map and the required braking torque (S20); distributing, by the controller CLR, the distributed braking torques of the front wheel and the rear wheel into the regenerative braking torque and the friction braking torque (S30); controlling, by the controller CLR, the motor M according to the regenerative braking torque, and performing friction braking with the friction braking mechanism BK according to the friction braking torque (S40).

Figure 5:
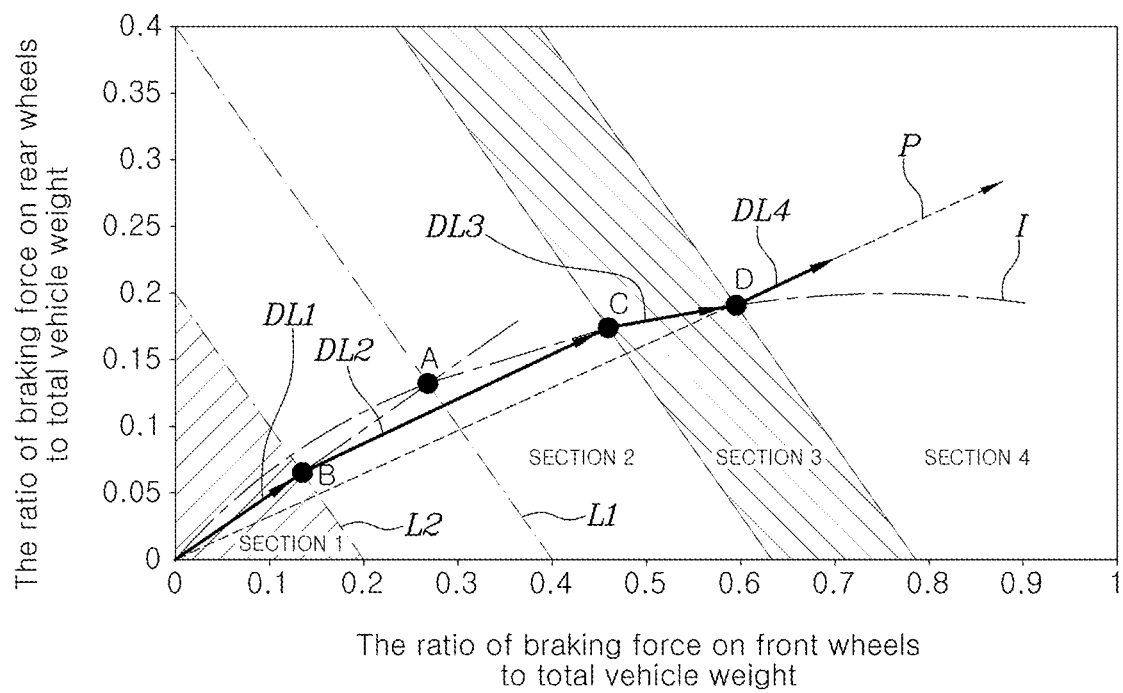
FIG. 5 is a diagram illustrating a braking torque distribution map of the braking control method according to various exemplary embodiments of the present invention.

Here, on the ideal braking force diagram illustrated in FIG. 5, an intersection point between an ideal braking force distribution line I and a maximum deceleration line L1 at which a vehicle may be braked by the motor M is set as a control point A; an intersection point B between a straight line connecting the control point A and a maximum deceleration line L2 at which a vehicle may be braked by the motor M based on a current vehicle speed from an origin at which all the braking forces of the front wheel and the rear wheel are 0 is set as a control point B; an intersection point, at which a straight line extending at the same slope as a simple braking force distribution line P of the braking device having a constant braking force distribution ratio of the front and rear wheels meets the ideal braking force distribution line I from the control point B, is set as a control point C; and an intersection point at which the simple braking force distribution line P meets the ideal braking force distribution line I is set as a control point D.

At the present time, the braking torque distribution map sets a deceleration area being the control point B or less as a section 1, a deceleration area exceeding the control point B and being control point C or less as a section 2, and a deceleration area exceeding the control point C and being control point D or less as a section 3, a deceleration area exceeding the control point D as a section 4, and is configured to distribute a braking force along a different braking force distribution line for each of the section 1, the section 2, the section 3 and the section 4.

That is, in the section 1, the braking force distribution line is formed of a straight line DL1 connecting the control point B from an origin at which all the braking forces of the front wheel and the rear wheel are 0; in the section 2, the braking force distribution line is formed of a straight line DL2 connecting the control point C from the control point B; in the section 3, the braking force distribution line is formed of a straight line DL3 connecting the control point D from the control point C; in the section 4, the braking force distribution line is formed of a straight line DL4 extending from the control point D along the simple braking force distribution line P.

Accordingly, in the sections 1 to 4, the braking force distribution lines have different slopes in each section, but are connected sequentially to form one consecutive braking force distribution line.

For reference, the maximum deceleration at which a vehicle may be braked by the motor M refers to the deceleration due to the maximum possible regenerative braking torque which may be implemented by the motor when considering a state of charge (SOC) value of a battery, a motor temperature, an inverter temperature, or the like (see FIG. 4), and the maximum deceleration at which a vehicle may be braked by the motor M based on the current vehicle speed refers to the maximum deceleration which may be obtained by the regenerative braking with the motor M when considering the friction characteristics of the current vehicle speed and road.

For reference, the required deceleration and the required braking torque may be easily converted to each other because the braking torque required for implementing the required deceleration is the required braking torque.

Furthermore, in FIG. 5, the ratio of the braking force to the total vehicle weight may be easily converted to the braking torque by the total vehicle weight and a dynamic load radius of a braking wheel.

In the section 1, the braking force distribution line is formed of the straight line DL1 connecting the control point B from an origin at which all the braking forces of the front wheel and the rear wheel are 0; when the required deceleration of the driver is changed in the section 1, the controller CLR controls the motor M to satisfy the required deceleration only with the regenerative braking.

That is, if the required deceleration determined according to the stroke of the driver depressing a brake pedal falls within the section 1, the present invention does not use the friction braking mechanism BK, and controls only the motor M to generate the braking torque configured for satisfying the required deceleration only by the regenerative braking.

At the present time, the braking torque according to the required deceleration is distributed to the front wheel and the rear wheel along the braking force distribution line of the section 1, and the ratio of the front wheel braking torque and the rear wheel braking torque is substantially determined by the gear ratio of the planetary gear set PG.

In the section 2, the braking force distribution line is formed of the straight line DL2 connecting the control point C from the control point B; when the required deceleration of the driver is changed in the section 2, the controller CLR controls the motor M to allow the regenerative braking to maintain the level of the control point B, and to add only the friction braking by the friction braking mechanism BK thereto, and thus controls the motor M to satisfy the required deceleration.

That is, if the required deceleration of the driver falls within the section 2, the controller CLR not increases the regenerative braking torque by the motor M, and adds only the friction braking by the friction braking mechanism BK while maintaining the regenerative braking torque in the control point B which is the boundary between the section 1 and the section 2 as it is, implementing the braking torque according to the required deceleration.

This is to increase only the braking torque by the friction braking in a state of maintaining the regenerative braking torque as it is because the required deceleration is the required deceleration greater than the maximum deceleration at which a vehicle may be braked by the motor M when considering the current vehicle speed of a vehicle, even if the required deceleration falls in some regions of the section 2 smaller than the maximum deceleration at which a vehicle may be braked by the motor M which may be implemented according to the motor M's own characteristic.

For reference, the reason why the braking force distribution line DL2 is drawn in parallel with the same slope as the slope of the simple braking force distribution line P in the present section 2 is because only the friction braking torque is increased while the regenerative braking torque is maintained as it is as described above.

In the section 3, the braking force distribution line is formed of a straight line DL3 connecting the control point D from the control point C; if the required deceleration of the driver increases in the section 3, the controller CLR controls the friction mechanism BK to increase the friction braking while gradually reducing the regenerative braking by the motor M, satisfying the required deceleration.

The controller CLR linearly decreases the regenerative braking by the motor M from the level at the control point B to 0, as the required deceleration of the driver increases over the entire section 3.

Figure 6:
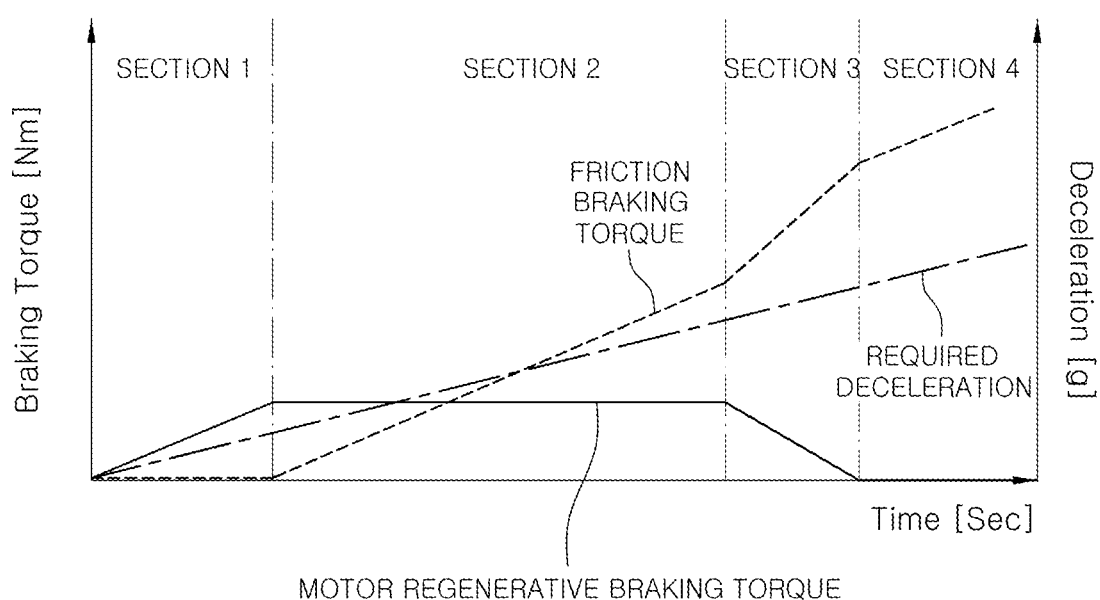
FIG. 6 is a graph summarizing a change in regenerative braking torque by a motor and friction braking torque by a friction braking mechanism, according to an increase in required deceleration with time, when a braking control is performed using the braking torque distribution map illustrated in FIG. 5 according to various exemplary embodiments of the present invention.

That is, when the required deceleration linearly increases in the present section 3 as illustrated in FIG. 6, as a result, the regenerative braking torque of the motor M is linearly reduced to 0 and the friction braking torque by the friction braking mechanism BK is linearly increased, satisfying the required deceleration.

In the present section, there is a disadvantage in that the regenerative braking force is reduced, but it is possible to prevent the locking of the rear wheel by setting the braking force distribution line in a direction of reducing the rear wheel braking force, improving braking stability of a vehicle.

In the section 4, the braking force distribution line is formed of a straight line DL4 extending from the control point D along the simple braking force distribution line P; when the required deceleration of the driver increases in the section 4, as a result, the controller CLR controls the friction braking force to be linearly increased by the friction braking mechanism BK.

That is, in such a section of high required deceleration, the controller CLR controls the friction braking mechanism BK to perform braking according to the braking force distribution of the front and rear wheels as in the related art along the simple braking force distribution line P of the friction braking mechanism BK.

For reference, in the aforementioned sections, it may be seen that the distributing of the front wheel braking torque and the rear wheel braking torque (S20) and the distributing of the regenerative braking torque and the friction braking torque (S30) are substantially, simultaneously performed according to the braking torque distribution map.

Meanwhile, the controller CLR may determine the friction characteristics of the road with the size of a wheel slip in the generating of the brake torque distribution map (S10).

That is, since the controller CLR may not directly confirm the friction characteristics of the road, the friction characteristics of the corresponding road are estimated with the degree of the wheel slip at that time.

Of course, when additionally receiving the friction characteristics of the corresponding road through a navigation system, a vehicle to something (V2X), or the like, the controller CLR may also use such information.

Furthermore, the term "controller" or "control unit" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A powertrain apparatus for a vehicle, the powertrain apparatus comprising:
    a motor;
    a planetary gear set including a first rotation element, a second rotation element and a third rotation element, wherein the first rotation element of the planetary gear set exchanges power with the motor;
    a front wheel driveshaft engaged to the planetary gear set to receive power from the second rotation element of the planetary gear set and to transfer a rotating force to a front wheel coupled to the front wheel driveshaft; and
    a rear wheel driveshaft engaged to the planetary gear set and mounted to receive power from the third rotation element of the planetary gear set to transfer a rotating force to a rear wheel coupled to the rear wheel driveshaft, wherein the planetary gear set is a single pinion planetary gear set,
wherein a rotation shaft of the motor is directly engaged to the first rotation element of the planetary gear set to exchange power therebetween,
wherein the first rotation element is a planet carrier, the second rotation element is a ring gear, and the third rotation element is a sun gear,
wherein the rotation shaft of the motor is formed of a hollow shaft, and
wherein one of the front wheel driveshaft and the rear wheel driveshaft is mounted to penetrate an interior of the rotation shaft of the motor.

2. The powertrain apparatus according to claim 1,
wherein a first gear is fixedly connected to the rotation shaft of the motor,
wherein a second gear gear-engaged to the first gear is fixedly connected to the first rotation element of the planetary gear set,
wherein a third gear is fixedly connected to the third rotation element of the planetary gear set, and
wherein a fourth gear gear-engaged to the third gear is fixedly connected to one of the front wheel driveshaft and the rear wheel driveshaft, which is mounted to penetrate the rotation shaft of the motor.

3. The powertrain apparatus according to claim 2,
wherein a fifth gear is fixedly connected to the third rotation element of the planetary gear set, and
wherein a sixth gear gear-engaged to the fifth gear is fixedly connected to another one of the front wheel driveshaft and the rear wheel driveshaft.

4. A braking control method for the powertrain apparatus of claim 1, the braking control method comprising:
generating, by a controller, a braking torque distribution map according to a vehicle speed and friction characteristics of a road and a maximum possible regenerative braking torque using an ideal braking force line diagram;
distributing, by the controller, braking torques of the front wheel and the rear wheel according to the braking torque distribution map and a required braking torque;
distributing, by the controller, the distributed braking torques of the front wheel and the rear wheel into a regenerative braking torque and a friction braking torque; and
controlling, by the controller, the motor according to the regenerative braking torque, and performing friction braking with a friction braking mechanism according to the friction braking torque.

5. The method according to claim 4, wherein
on the ideal braking force line diagram which includes an intersection point between an ideal braking force distribution line at which the vehicle is braked by the motor and a maximum deceleration line at which the vehicle is braked by the motor as a control point A, an intersection point between a straight line connecting the control point A and the maximum deceleration line at which the vehicle is braked by the motor based on a current vehicle speed from an origin at which braking forces of the front wheel and the rear wheel are 0 as a control point B, an intersection point at which a straight line extending from the control point B at a same slope as a simple braking force distribution line of a braking device having a constant front and rear wheel braking force distribution ratio meets the ideal braking force distribution line as a control point C, an intersection point at which the simple braking force distribution line meets the ideal braking force distribution line as a control point D,
the braking torque distribution map includes a deceleration region which is the control point B or less and is set as a section 1, a deceleration region which exceeds the control point B and is the control point C or less and is set as a section 2, a deceleration region which exceeds the control point C and is the control point D or less and is set as a section 3, and a deceleration region which exceeds the control point D and is set as a section 4,
wherein the braking forces of the front wheel and the rear wheel are distributed according to different braking force distribution lines per each section of the section 1, the section 2, the section 3 and the section 4.

6. The method according to claim 5,
wherein in the section 1, the braking force distribution line includes a straight line connecting the control point B from an origin at which the braking forces of the front wheel and the rear wheel are 0,
wherein in the section 2, the braking force distribution line includes a straight line connecting the control point C from the control point B,
wherein in the section 3, the braking force distribution line includes a straight line connecting the control point D from the control point C, and
wherein in the section 4, the braking force distribution line includes a straight line extending from the control point D along the simple braking force distribution line.

7. The method according to claim 5,
wherein in the section 1, the braking force distribution line includes a straight line connecting the control point B from an origin at which the braking forces of the front wheel and the rear wheel are 0, and
wherein when a required deceleration of a driver is changed in the section 1, the controller is configured to satisfy the required deceleration with regenerative braking by the motor.

8. The method according to claim 7,
wherein in the section 2, the braking force distribution line includes a straight line connecting the control point C from the control point B, and
wherein when the required deceleration of the driver is changed in the section 2, the controller is configured to control the motor to allow the regenerative braking to maintain a level of the control point B, and to add the friction braking by the friction braking mechanism thereto, satisfying the required deceleration.

9. The method according to claim 8,
wherein in the section 3, the braking force distribution line includes a straight line connecting the control point D from the control point C, and
wherein when the required deceleration of the driver is increased in the section 3, the controller is configured to increase the friction braking by the friction braking mechanism while reducing the regenerative braking by the motor, satisfying the required deceleration.

10. The method according to claim 9,
wherein the controller is configured to linearly reduce the regenerative braking by the motor from the level of the control point B to 0, as the required deceleration of the driver increase over an entire section of the section 3.

11. The method according to claim 9, wherein in the section 4, the braking force distribution line includes a straight line extending from the control point D along the simple braking force distribution line, and wherein when the required deceleration of the driver increases in the section 4, the controller is configured to linearly increase a friction braking force by the friction braking mechanism.

12. A powertrain apparatus for a vehicle, the powertrain apparatus comprising:
- a motor;
- a planetary gear set including a first rotation element, a second rotation element and a third rotation element, wherein the first rotation element of the planetary gear set exchanges power with the motor;
- a front wheel driveshaft engaged to the planetary gear set to receive power from the second rotation element of the planetary gear set and to transfer a rotating force to a front wheel coupled to the front wheel driveshaft; and
- a rear wheel driveshaft engaged to the planetary gear set and mounted to receive power from the third rotation element of the planetary gear set to transfer a rotating force to a rear wheel coupled to the rear wheel driveshaft, wherein the planetary gear set is a double pinion planetary gear set, wherein a rotation shaft of the motor is directly engaged to the second rotation element of the planetary gear set to exchange power therebetween, wherein the first rotation element is a planet carrier, the second rotation element is a ring gear, and the third rotation element is a sun gear, wherein the rotation shaft of the motor is formed of a hollow shaft, and wherein one of the front wheel driveshaft and the rear wheel driveshaft is mounted to penetrate an interior of the rotation shaft of the motor.

13. The powertrain apparatus according to claim 12, wherein a first gear is fixedly connected to the rotation shaft of the motor, wherein a second gear gear-engaged to the first gear is fixedly connected to the second rotation element of the planetary gear set, wherein a third gear is fixedly connected to the first rotation element of the planetary gear set, and wherein a fourth gear gear-engaged to the third gear is fixedly connected to one of the front wheel driveshaft and the rear wheel driveshaft, which is mounted to penetrate the rotation shaft of the motor.

14. The powertrain apparatus according to claim 13, wherein a fifth gear is fixedly connected to the third rotation element of the planetary gear set, and wherein a sixth gear gear-engaged to the fifth gear is provided on another one of the front wheel driveshaft and the rear wheel driveshaft.

* * * * *